United States Patent
Bofferding et al.

(10) Patent No.: US 10,540,252 B2
(45) Date of Patent: *Jan. 21, 2020

(54) ANALYTIC AND LAYER-BASED AUGMENTATION OF CODE REVIEWS

(71) Applicant: International Business Machines Corporation, Armonk, NY (US)

(72) Inventors: Nicholas E. Bofferding, Cedar Park, TX (US); Andrew Geissler, Austin, TX (US); Michael C. Hollinger, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 27 days.

This patent is subject to a terminal disclaimer.

(21) Appl. No.: 15/833,764

(22) Filed: Dec. 6, 2017

(65) Prior Publication Data

US 2018/0095860 A1    Apr. 5, 2018

Related U.S. Application Data

(63) Continuation of application No. 15/055,867, filed on Feb. 9, 2016, now Pat. No. 9,880,921.

(51) Int. Cl.
*G06F 9/44*    (2018.01)
*G06F 11/36*    (2006.01)

(52) U.S. Cl.
CPC ............... *G06F 11/3604* (2013.01)

(58) Field of Classification Search
CPC .................................. G06F 11/3604
See application file for complete search history.

(56) References Cited

U.S. PATENT DOCUMENTS

| | | | |
|---|---|---|---|
| 8,423,960 B2 | 4/2013 | Farchi et al. | |
| 8,448,141 B2 | 5/2013 | Blount et al. | |
| 8,856,725 B1* | 10/2014 | Anderson | G06F 8/75 717/103 |
| 2007/0044075 A1* | 2/2007 | Koning | G06F 8/70 717/122 |
| 2012/0311540 A1 | 12/2012 | Fanning et al. | |
| 2012/0324425 A1 | 12/2012 | Roberts et al. | |
| 2017/0249231 A1 | 8/2017 | Bofferding et al. | |

OTHER PUBLICATIONS

"SonarQube," sonarqube.org, 1 page, Printed Nov. 4, 2015, http://www.sonarqube.org/.
List of IBM Patents or Patent Applications Treated as Related, Dec. 6, 2017, 2 pgs.

* cited by examiner

*Primary Examiner* — Hang Pan
(74) *Attorney, Agent, or Firm* — Jared L. Montanaro

(57) ABSTRACT

A computer system may identify a source code for a program. The source code may include one or more instructions. The computer system may then receive a selection of two or more assessment metrics for evaluating the source code. The computer system may then generate an assessment score for each instruction in the source code based on the two or more assessment metrics. The computer system may then provide an assessment score indicator to for each instruction in the source code.

17 Claims, 9 Drawing Sheets

| Line | Source Code |
|---|---|
| 1 | Manage_lun.hdr.flags = |
| 2 | |
| 3 | *CallMethod();* |
| 4 | *if(doWork);* |
| 5 | Break; |
| 6 | Default; |
| 7 | TRACEV("ioctl rsult")/ |
| 8 | |
| 9 | iterations* = 1; |
| 10 | execute * = 4; |
| 11 | if not for < 2; |
| 12 | |
| 13 | |
| 14 | <u><define i = inputi>;</u> |
| 15 | for (input i = 1; i > execute; ++i) |
| 16 | Stop (50) |

500 — 510 — 512 — 516 — 518 — 514

LAYER SELECTION (520)
- [X] Assessment Metric 1 — 522
- [X] Assessment Metric 2 — 524
- [ ] Assessment Metric 3

LEGEND (530)
| | 0 – 35 | *Italicize* |
|---|---|---|
| | 36 – 70 | <u>Underline</u> |
| | 71 – 100 | *<u>Italicize/ Underline</u>* |

| Line | Source Code |
|---|---|
| 1 | Manage_lun.hdr.flags = |
| 2 |  |
| 3 | *callMethod();* ⎫ 616 |
| 4 | *if (doWork);* ⎭ |
| 5 |  |
| 6 | Break; |
| 7 | Default; |
| 8 | TRACEV("ioctl rsult")/ |
| 9 |  |
| 10 | iterations* = 1; |
| 11 | execute * = 4; |
| 12 | if not for < 2; |
| 13 |  |
| 14 | <u>*<define i = input i>;*</u> ⎬ 618 |
| 15 |  |
| 16 | for (input i = 1; i > execute; ++i) |
| 17 | Stop (50) |

620

| LAYER SELECTION | |
|---|---|
| [X] | Assessment Metric 1 ⎬ 622 |
| [X] | Assessment Metric 2 ⎬ 624 |
| [ ] | Assessment Metric 3 |

630

| LEGEND | |
|---|---|
| 0 – 35 | *Italicize* |
| 36 – 70 | <u>Underline</u> |
| 71 – 100 | <u>*Italicize/ Underline*</u> |

| Line | Source Code |
|---|---|
| 1 | Manage_lun.hdr.flags = |
| 2 |  |
| 3 | callMethod(); |
| 4 | if (doWork);  } 712 |
| 5 |  |
| 6 | Break; |
| 7 | Default; |
| 8 | TRACEV("ioctl rsult")/ |
| 9 |  |
| 10 | iterations* = 1; |
| 11 | execute * = 4; |
| 12 | if not for < 2; |
| 13 |  |
| 14 | <define i = input i>; |
| 15 |  |
| 16 | for (input i = 1; i > execute; ++i) |
| 17 | Stop (50) |

714 points to lines 3, 4

720

| Line | Reference Source Code |
|---|---|
| 1 |  |
| 2 | callMethod1(%)/; |
| 3 | if (doWork); |
| 4 | ifnot (doWork2);  } 722 |
| 5 | sleep; |
| 6 |  |
| 7 |  |

FIG. 7

| Instruction | A | B | C | D | Assessment Scores |
|---|---|---|---|---|---|
| 1 | 10 | 20 | 30 | 40 | 100 |
| 2 | 20 | 40 | 60 | 80 | 50 |
| 3 | 15 | 30 | 10 | 90 | 40 |

FIG. 8

ANALYTIC AND LAYER-BASED AUGMENTATION OF CODE REVIEWS

BACKGROUND

The present disclosure relates generally to the field of computer software, and more specifically to providing an assessment score indicator for source code under review to a user.

It is common development practice for a group of peers (e.g., developers or reviewers) to review source code changes made by a developer for quality before the source code changes are committed into the official source code. In a typical scenario, the developer pushes source code changes into a review environment, where one or more reviewers can comment on the source code changes and determine if the source code changes should be sent back to the developer for modification or committed into the official source code.

SUMMARY

Embodiments of the present invention disclose a method, computer program product, and system for reviewing source code changes. A computer system may identify source code for a program. The source code may include one or more instructions. The computer system may then receive a selection of two or more assessment metrics for evaluating the code from a user. The computer system may then generate an assessment score for each instruction in the source code based on the two or more assessment metrics selected by the user. The computer system may then provide an assessment score indicator for each instruction to the user.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 5 illustrates an example of assessment score indicators as font modifications and background layers shadowed in the background of the line numbers and text of changed instructions, in accordance with embodiments of the present disclosure.

FIG. 6 illustrates an example of assessment score indicators as font modifications to the text of changed instructions, in accordance with embodiments of the present disclosure.

FIG. 7 illustrates an example of an alert that may be generated, in accordance with embodiments of the present disclosure.

FIG. 8 illustrates a table depicting the relationship between assessment metrics, metric scores, and assessment scores, in accordance with embodiments of the present disclosure.

Figure 1:
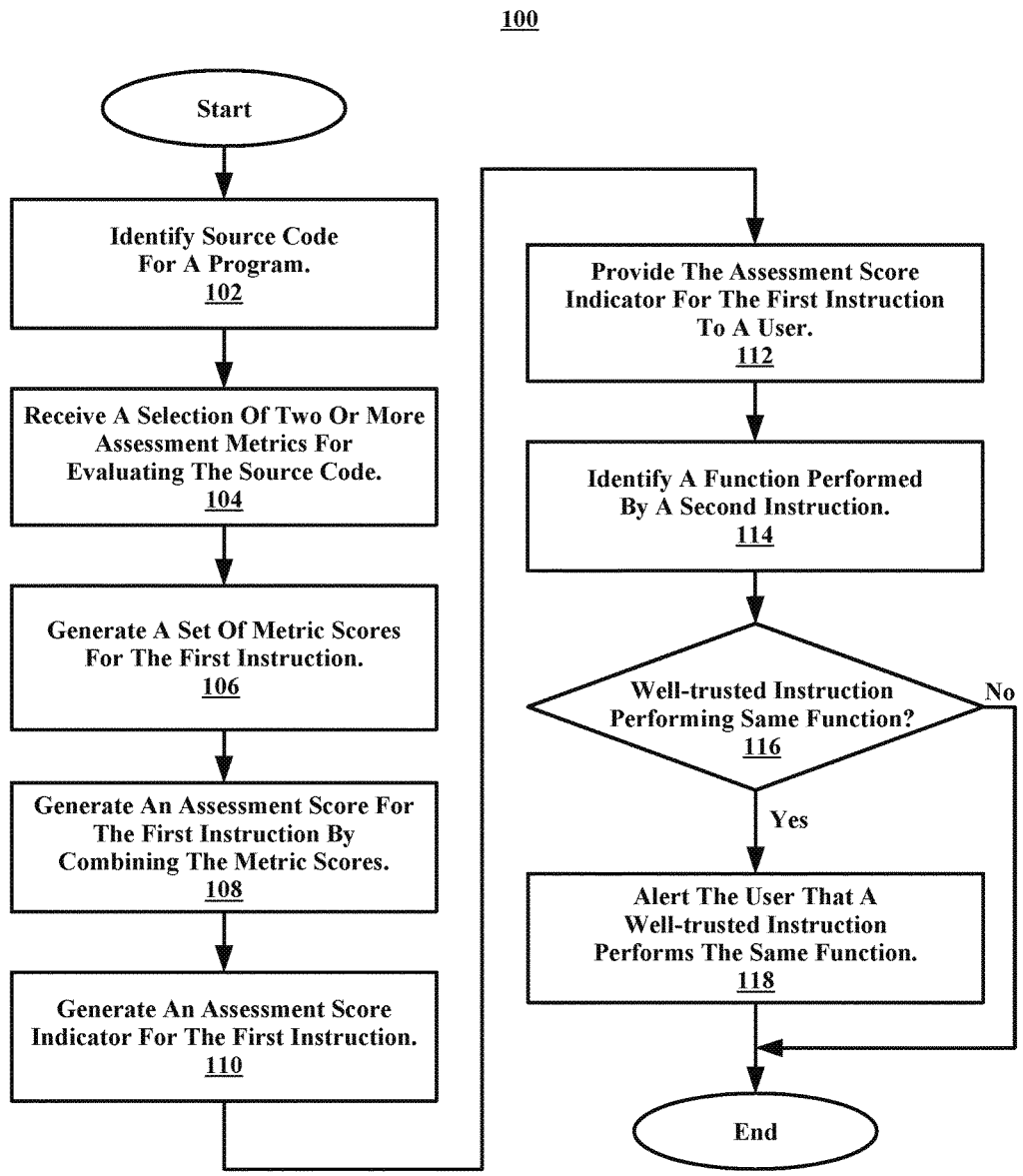
FIG. 1 illustrates a flowchart depicting an example method for providing the user with an assessment score indicator, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of computer software, and more specifically to providing an assessment score indicator for source code under review to a user. While the present disclosure is not necessarily limited to such applications, various aspects of the disclosure may be appreciated through a discussion of various examples using this context.

Developers often seek review of a source code change (e.g., changes to one or more instructions or code segments) before committing the change to the official source code for the program. For example, the developer may create a first source code version; the first source code version may include a first instruction that performs a particular function. The developer may then change the first instruction to now perform a new function. The first source code version may now require review to determine that the first instruction now performs the new function properly. The review process may begin with the source code change being pushed into a review environment. Upon being placed in the review environment, a user (e.g., a reviewer, a manager, a developer, a peer, a student, a teacher, etc.) may pull the entire source code, only the changes to the source code, or any source code portion in between and begin to review the source code for errors, defects, latency problems, and/or other issues.

In some embodiments, the review environment may be a repository from which a user may pull the source code change. The source code change may then be viewed using a user interface (e.g., a graphical user interface (GUI) of an output device, such as a monitor) by the user to identify any issues within its instructions. In other embodiments, the review environment may be a code editor. The code editor may be a GUI that allows the user to review the source code change for issues (e.g., displays the source code to the user and allows the user to make changes and/or mark the code).

Sometimes, the user may only wish to review some of the changes. This may be because, for example, the user may be pressed for time, have little context about how the code operates, have no experience in the domain of the review, have an unclear picture of the best practices to follow for reviewing the code, or have no idea about which instruction might merit the most review. For example, the user may be experienced with Python but may not understand the complexities of C++. As another example, the user may receive a set of instructions instead of the entire source code, and the user may not be able to determine how the source code functions (e.g., how the changed portions of the source code interacts with other parts of the source code).

To help aid review of source code for a program, a processor may prompt a user to select assessment metrics the user may want to focus on. The assessment metrics may include, but are not limited to: defect density (e.g., the ratio of defects in the instruction compared to the instruction's size), change recency (e.g., how long ago the instruction was changed), code coverage, code complexity, degree of dependency, code usage (e.g., number of times the instruction is hit during an integration run), if an Inter-Process Communication (IPC) call is in the path of a changed function (e.g., whether there is a client-server relationship that is now using a changed instruction in the source code), if an area of code is associated with defects, or the program's stage of release (e.g., if the program is in early development or being prepared for the public distribution).

For example, after retrieving the source code change from the review environment, the processor may prompt the user to select assessment metrics from a list of available assessment metrics. The user may select two or more assessment metrics from the available list to focus on, thereby creating a custom metric, and the processor may provide the user with a visual indication of that selection (e.g., the custom metric). The user may select the assessment metrics using any type of user interface (e.g., command line prompts, graphical user interface, etc.). For example, the processor may prompt the user with a GUI that may have a checkbox, a radio dial, or a tab.

Upon selection of two or more of the assessment metrics by the user, the processor may generate metric scores for each instruction. The metric scores may be generated as numerical values indicating the degree of scrutiny warranted for an instruction based off a single assessment metric. For example, a metric score may be given on a scale of 0 to 100, with a metric score of 0 meaning the instruction may warrant little to no review for the single assessment metric and a metric score of 100 meaning the instruction may warrant a high level of review for the single assessment metric. The processor may then combine the metric scores for an instruction using any statistical function (e.g., addition) and may generate an assessment score for the instruction. The assessment score may be a numerical value indicating the degree of scrutiny warranted for an instruction based off of two or more selected assessment metrics.

In some embodiments, the processor may take into account the relationship between the selected assessment metrics (e.g., the interaction associated between the two or more selected metrics and how dependent the changed instruction is to the rest of the source code based on the two or more selected metrics) and adjust the assessment score accordingly. The metrics scores may be weighted prior to being combined to generate the assessment scores. The weighting of each metric score may be based on the relationship between assessment metrics (e.g., more important assessment metrics may be weighted higher). For example, the processor may evaluate instructions that are inter-process communication (IPC) calls with the selected metric of code usage (e.g., the number of times the instruction is hit during an integration run). The instruction may be used heavily by the source code and the processor may generate a relatively high weight for the instruction based on code usage.

In some embodiments, the metric scores may be generated in a static environment not including runtime (e.g., predicted based on simulations without executing the code). The metric scores may be generated for each instruction based on the predicted outcomes each instruction may produce (e.g., what may occur if the instruction is in a runtime environment), based on the selected assessment metrics. The processor may then combine the metric scores to generate the assessment score. In other embodiments, the metric scores may be generated in a runtime environment (e.g., a sandbox environment). The metric scores may be generated for each instruction based on the actual outcomes each instruction may produce (e.g., how the instruction behaves after execution), based on the selected assessment metrics. The processor may then combine the metric scores to generate the assessment score.

The processor may then provide the user an assessment score indicator for each instruction in the source code. The assessment score indicator may be a visual signal that is based on the assessment score. The assessment score indicator may change as the severity of warranted review changes for an instruction (e.g., as the assessment score changes). The visual signal may be provided to help the user focus their attention on instructions having a high likelihood of issues based upon the selected two or more assessment metrics. The user may also toggle between visual signals by selecting two or more different assessment metrics to review.

In some embodiments, the visual signal may be a visual overlay that may be superimposed over, or shadowed in the background of, the line number of the instruction, the text of the instruction, or over both the text and line number of the instruction. For example, a first changed instruction may be under review. The first changed instruction may be assigned a red overlay to indicate to the user that it may have a relatively high assessment score (e.g., the assessment score is at or above a predetermined threshold) and may merit a high level of review.

In other embodiments, the visual signal may be a modification of the font color of the text of the instruction, the line number associated with the instruction, or both the text and line number associated with the instruction. For example, a second changed instruction may be under review. The second changed instruction may have its font color modified to red to indicate to the user that it may have a relatively high assessment score (e.g., the assessment score is at or above a predetermined threshold) and may merit a high level of review.

Referring now to FIG. 1, illustrated is a flowchart of an example method 100 for providing an assessment score indicator for source code under review to a user, according to embodiments. The method 100 may be performed by a computer system. In some embodiments, one or more operations in the method 100 may be performed by a user, or by the computer system in response to user input. The method 100 may begin at operation 102, where the computer system may identify source code for a program. The source code may include one or more instructions, including a first instruction. In some embodiments, the source code may include one or more changed instructions (e.g., modified instructions that have been submitted for review by a developer).

The computer system may identify the source code by pulling the source code randomly or in some order from a repository in response to a user selecting a program to review. The source code may be placed in the repository by a developer submitting changes for review. In other embodiments, an assigner (e.g., a developer) may push the program to the computer system to have a specific user review the source code.

After identifying source code for a program at operation 102, the computer system may receive a selection of two or more assessment metrics from a user at operation 104. The assessment metrics may include defect density, change recency, code usage, change frequency, code complexity. In some embodiments, the computer system may automatically select the two or more assessment metrics. In other embodiments, the user may select the two or more assessment metrics. In further embodiments, a developer who submitted the changes for review may select the assessment metrics (e.g., based on his knowledge of the code or the changes).

The computer system may prompt the user to select the two or more assessment metrics using a user interface. For example, the computer system may prompt the user to select the two or more assessment metrics using a layer selection prompt window. The selection prompt window may include a checkbox for selecting which assessment metrics the user may want to evaluate. In some embodiments, the user may be prompted to select the two or more assessment metrics with a pop-up window listing each assessment metric. The two or more assessment metrics in the pop-up window may be selected by highlighting which assessment metrics the user may want to use to evaluate the source code.

After receiving a selection of two or more assessment metrics at operation 104, the computer system may generate a set of metric scores for the first instruction at operation 106. The computer system may generate a single metric score for each of the assessment metrics selected in operation 104.

In some embodiments, the metric scores may be generated as numerical values indicating the degree of scrutiny warranted for an instruction based on the associated assessment metrics. For example, a user may have selected defect density as one of the two or more selected assessment metrics. The computer system may generate a metric score of 20 for the first instruction based on defect density. The metric score may be on a scale of 0 to 100, with a metric score of 0 to 35 meaning the first instruction merits little to no review.

The computer system may execute the source code in a dynamic program analysis application to generate the metric scores. For example, an assessment metric of code usage may be selected (e.g., the number of times the first instruction is hit during an integration run). The computer system may execute the source code in a sandbox environment and determine that the first instruction is hit 15 times during the integration run. The computer system may generate a metric score of 70 for the first instruction based on code coverage because being hit 15 times in the integration run may be a relatively high number of times. In some embodiments, the computer system may use static program analysis. Other methods for scoring code based on a given criteria (e.g., assessment metric) will be apparent to persons of ordinary skill in the art. The examples disclosed herein are discussed for illustrative purposes, and the present disclosure should not be limited to such examples.

After generating metric scores for the first instruction at operation 106, the computer system may generate an assessment score for the first instruction at operation 108. The computer system may generate the assessment score for the first instruction by combining the metric scores for the first instruction using any statistical function. In some embodiments, the statistical function may depend on the combination of selected assessment metrics.

In some embodiments, the computer system may generate an assessment score for the first instruction by adding the metric scores associated with the first instruction. For example, the first instruction may have a metric score of 10 based on defect density, a metric score of 20 based on change recency, and a metric score of 30 based on code coverage. The processor may generate an assessment score of 60 for the first instruction by adding the corresponding metric scores (e.g., 10+20+30=60).

In other embodiments, the processor may generate an assessment score for the first instruction by averaging the metric scores associated with the first instruction. For example, the first instruction may have a metric score of 20 based on defect density, a metric score of 40 based on change recency, and a metric score of 60 based on code coverage. The processor may generate an assessment score of 40 for the first instruction by averaging the corresponding metric scores (e.g., (20 +40+60)/3=40).

In further embodiments, the processor may weight (e.g., assign a weighting coefficient to) each metric score and generate an assessment score for the first instruction by determining the weighted average of the metric scores associated with the first instruction. For example, the user may select three assessment metrics: defect density, code coverage, and code complexity. The computer system may determine that defect density has the greatest effect on the first instruction compared to the other assessment metrics. This may be because defect density has been flagged by a group of programmers as an assessment metric indicative of high code error or need for review. Accordingly, the computer system may assign a weighting coefficient of 5 to the metric score associated with defect density. The computer system may also determine that code complexity has the lowest effect on the first instruction compared to the other assessment metrics. This may be because code complexity has been regarded by a group of programmers as an assessment metric not indicative of code error or need for review. Accordingly, the computer system may assign a weighting coefficient of 0.5 to the metric score associated with code complexity.

The computer system may then generate the assessment score for the first instruction by calculating the weighted average of the metric scores. For example, the computer system may generate the assessment score for the first instruction using the following formula:

$$\sum_{i=1}^{n}(w_i M_i)/n$$

Where $w_i$ is a weighting coefficient determined by the computer system dependent on the effect an assessment metric has on the first instruction, $M_i$ is a metric score, and n is the number of total metric scores. For example, the first instruction may have a metric score of 15 based on defect density, a metric score of 30 based on code coverage, and a metric score of 90 based on code complexity. The computer system may generate an assessment score of 50 for the first instruction using the above formula and weighting coefficients for defect density and code complexity (e.g., [(5× 15)+(1×30)+(0.5×90)]/3=(75+30+45)/3=50).

After generating an assessment score for the instruction at operation 108, the computer system may generate an assessment score indicator at operation 110. The assessment score indicator may be a visual signal that is based on the assessment score of the first instruction. For example, the assessment score indicator may be a visual overlap superimposed over code in a graphical user interface (e.g., a code review window where the source code under review is shown to the user). In some embodiments, the assessment score indicator may be a background color behind or around the text of the first instruction (or the text of its associated line numbers) in the code review window. In further embodiments, the assessment score indicator may be a special font (e.g., italicized or underlined font) or font color of the text (or line numbers) of the first instruction. The special font may be based on the assessment score for the first instruction. Example assessment score indicators are discussed in more detail in reference to FIGS. 2-6.

After generating the assessment score indicator for the first instruction at operation 110, the computer system may provide the assessment score indicator to a user at operation 112. For example, the assessment score indicator may be inserted into a code review window or graphical user interface and provided to a user with a monitor, or transmitted to an output device such as a tablet. The assessment score indicator may signal to the user what level of review the first instruction may merit.

At operation 114, the computer system may identify a function performed by a second instruction. In some embodiments, the function performed by the second instruction may be identified after the generation of the assessment score for the first instruction. In further embodiments, the second instruction may be the same as the first instruction. There are numerous ways that the computer system may identify the function performed by the second instruction. In some embodiments, the computer system may utilize one or more dynamic program analysis techniques to determine the function of the second instruction. Dynamic program analysis may include executing the program and monitoring the runtime of the program. For example, the computer system may run the source code in a sandbox environment. During execution, the computer system may monitor the runtime to identify the function performed by each instruction in the source code for the program. For example, the computer system may determine that the second instruction saves information to a storage system.

In further embodiments, the source code may be parsed to determine source line similarities between the source code and a reference source code. In other embodiments, a user may associate a pre-existing block of code in a reference repository to a tag indicating the pre-existing block of code's logical behavior. Upon execution of the code during review, the review engine may identify blocks of code under review as similar to the pre-existing block of code by the associated tag (e.g., signaling to a reviewer that the blocks of code under review perform a logically similar behavior as the pre-existing block of code). Many dynamic program analysis techniques for determining the function of a line (or lines) of code are known to persons of ordinary skill (e.g., executing the line of code in a real and/or virtual processor to determine the definite behavior of the line of code). All such techniques that are otherwise consistent with this disclosure are contemplated.

In some embodiments, the computer system may perform static program analysis of the source code in order to determine the function of the second instruction. Static program analysis may include analyzing the source code for the program without actually executing the program. The computer system may analyze each instruction (or each changed instruction) in the source code to identify the function of each instruction. For example, the computer system may parse the source code and determine that the second instruction saves information to a storage system (e.g., writes to persistent storage or memory). Many static program analysis techniques that can determine the function of a line (or lines) of code are known to persons of ordinary skill. All such techniques that are otherwise consistent with this disclosure are contemplated.

After the computer system identifies the function performed by the second instruction at operation 114, the computer system may determine if a well-trusted instruction (also referred to as a reference instruction) performs the same function at decision block 116. For example, the computer system may pull a reference source code from a reference repository and run the reference source code in a review environment (e.g., sandbox environment). The computer system may identify a well-trusted instruction from the reference source code as performing the same, or logical equivalent, function as the instruction found in operation 114 (e.g., pushing information to a storage system by use of a different code). The computer system may identify the function of the second instruction from operation 114 and the well-trusted instruction using any evaluation technique or method, such as those discussed in reference to operation 114.

In some embodiments, the well-trusted instruction may be tagged as performing a function. For example, the well-trusted instruction may be tagged as performing the function of pushing information to a storage system. The computer system may access the reference repository after identifying the function performed by the second instruction. Then pull the well-trusted instruction tagged as performing the same, or logical equivalent function as the second instruction without running the well-trusted instruction in a sandbox environment.

If the computer system does not find a well-trusted instruction that performs the same or logical equivalent function as the second instruction at decision block 116, the method 100 may end. If, however, the computer system does find a well-trusted instruction that performs the same, or logical equivalent, function as the second instruction at decision block 116, the method 100 may proceed to operation 118. At operation 118, the computer system may alert a user that the well-trusted instruction performs the same, or logical equivalent, function as the second instruction.

For example, the alert may be a hyperlink to a well-trusted instruction identified by the computer system. The well-trusted instruction may correspond to the second instruction by functioning the same as, or logically equivalent to, the second instruction and. A user may interact with the alert (e.g., by clicking the hyperlink that the computer system may insert into the line number associated with the second instruction), and the user may be directed to the well-trusted instruction. The user may then determine whether to replace, edit, or review the second instruction using the well-trusted instruction. For example, the user may determine that the well-trusted instruction is more computationally efficient than the second instruction. Therefore, the user may replace the second instruction with the well-trusted instruction. In some embodiments, the well-trusted instruction may be regarded as well-trusted based of the reputation of the developer who created the instruction. In other embodiments, the well-trusted instruction may be regarded as well-trusted based of the relative age of the instruction (e.g., the older it is the less likely it is to have defects). In some embodiments operation 114, decision block 116, and operation 118 may be performed separately from or not at all in method 100.

Figure 2:
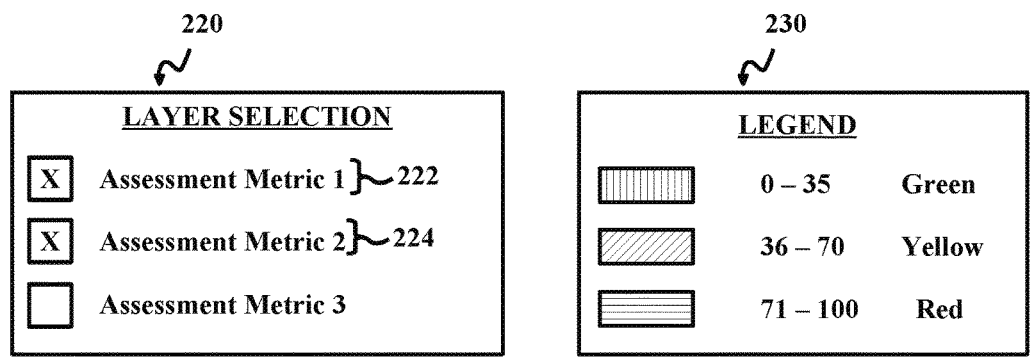
FIG. 2 illustrates an example of assessment score indicators as overlays superimposed over the text of changed instructions, in accordance with embodiments of the present disclosure.

Referring now to FIG. 2, illustrated is an example of a code review window 200 that includes a source code 210, a layer selection prompt window 220, and a legend 230. The source code 210 may include two changed instructions 216 and 218. The layer selection prompt window 220 may enable the user to select the assessment metrics that the user may want to focus on. While the layer selection prompt window 220 has three assessment metrics, any number of assessment metrics may be used. For example, layer selection prompt window 220 may display to the user all of the assessment metrics discussed herein. FIG. 2 further illustrates two assessment score indicators 212 and 214 as overlays superimposed over the text of the instructions in the source code 210. The assessment score indicators 212 and 214 may correspond to the associated assessment scores as shown in the legend 230.

For example, a user may select two assessment metrics. The first selected assessment metric 222 may correspond to code coverage (e.g., how many times the instruction is tested over a period of time). The second selected assessment metric 224 may correspond to code complexity (e.g., how many paths the instruction uses throughout the source code). The processor may generate an assessment score for each changed instruction 216 and 218 in source code 210, leaving unchanged instructions unmarked. The processor may generate an assessment score of 45 for the first changed instruction 216 of the source code 210 based on the selected assessment metrics (e.g. code coverage and code complexity).

The processor may then generate a first assessment score indicator 212 as a yellow overlay. The processor may superimpose the yellow overlay over the text of the instruction associated with the first changed instruction 216 (e.g., lines 3 through 4). The processor may also generate an assessment score of 80 for the second changed instruction 218 of the source code 210 based on the selected assessment metrics. The processor may then generate a second assessment score indicator 214 as a red overlay. The processor may superimpose the red overlay over the text of the instruction associated with the second changed instruction 218 (e.g., line 14).

The first assessment score indicator 212 may signal to the user that the first changed instruction 216 may merit moderate review based on code coverage and code complexity. This may be because the changed instruction 216 may have a low code coverage and low code complexity (e.g., the instruction may not have been tested numerous times, but it may also not be used in many paths throughout the source code 210). Additionally, the second assessment score indicator 214 may signal to the user that the second changed instruction 218 may merit a relatively high level of review based on code coverage and code complexity. This may be because the second changed instruction 218 may have low code coverage and high code complexity (e.g., the instruction may not have been tested often and the instruction may be used in many paths throughout the source code 210).

In some embodiments, the overlay may be a color gradient (e.g., a heat map). For example, if an instruction's assessment score is 0-35, then a shade of green may be superimposed over the instruction's text or line number. If the score is 0, then the instruction may be superimposed with a light green overlay, the gradient may vary to a dark green overlay if the instruction may have an assessment score of 35. If an instruction's assessment score is 36-70, then a shade of yellow may be superimposed over the instruction's text or line number. If the score is 36, then the instruction may be superimposed with a light yellow overlay, the gradient may vary to a bright yellow overlay if the instruction may have an assessment score of 70. If an instruction's assessment score is 71-100, then a shade of red may be superimposed over the instruction's text or line number. If the score is 71, then the instruction may be superimposed with a light red overlay, the gradient may vary to a bright red overlay if the instruction may have an assessment score of 100. The gradients signaling to the user which instructions may merit little to no review, up to the instructions that may merit a relatively high level of review.

In other embodiments, the processor may not generate an assessment score indicator for relatively low assessment scored instructions. For example, if an instruction's assessment score is 0-35, the processor may define the assessment score as low and not superimpose an overlay or modify the font color of the instruction. This may signal to the user that the instruction merits little to no review.

Figure 3:
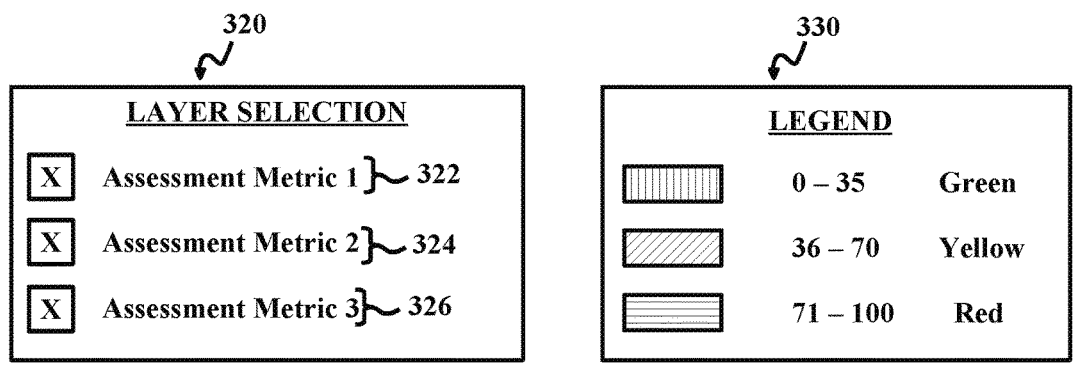
FIG. 3 illustrates an example of assessment score indicators as background layers shadowed in the background of the line numbers and text of changed instructions, in accordance with embodiments of the present disclosure.

Now turning to FIG. 3, illustrated is an example of a code review window 300 that includes a source code 310, a layer selection prompt window 320, and a legend 330, according to embodiments. The source code 310 may include two changed instructions 316 and 318. The layer selection prompt window 320 may enable the user to select the assessment metrics that the user may want to focus on, as discussed in reference to FIG. 2. FIG. 3 further illustrates two assessment score indicators 312 and 314 as background layers shadowed in the background of the text and line numbers of the changed instructions in the source code 310. The assessment score indicators 312 and 314 may correspond to the associated assessment scores as shown in the legend 330.

For example, a user may select three assessment metrics. The first selected assessment metric 322 may correspond to code coverage (e.g., how tested the instruction is). The second selected assessment metric 324 may correspond to code complexity (e.g., how many paths the instruction uses throughout the source code). The third selected assessment metric 326 may correspond to change recency (e.g., how long ago the instruction has been changed). The processor may generate an assessment score for each changed instruction 316 and 318 in source code 310, leaving unchanged instructions unmarked.

The processor may generate an assessment score of 30 for the first changed instruction 316 of the source code 310 based on the selected assessment metrics. The processor may then generate a first assessment score indicator 312 as a green background layer. The processor may shadow the green background layer behind the text and line numbers associated with the first changed instruction 316 (e.g., over lines 3 through 4). The processor may also generate an assessment score of 65 for the second changed instruction 318 of the source code 310 based on the selected assessment metrics. The processor may then generate a second assessment score indicator 314 as a yellow background layer. The processor may shadow the yellow background layer behind the text and line number associated with the second changed instruction 318 (e.g., over line 14).

The first assessment score indicator 312 may signal to the user that the first changed instruction 316 may merit little to no review based on code coverage, code complexity, and change recency. This may be because the first changed instruction 316 may have a high code coverage, low code complexity, and a low change recency (e.g., the instruction may have been tested numerous times, may not be used in many paths throughout the source code 310, and has not been recently changed). Additionally, the second assessment score indicator 314 may signal to the user that the second changed instruction 318 may merit moderate review based on code coverage, code complexity, and change recency. This may be because the second changed instruction 318 may have high code coverage, high code complexity, and a high change recency (e.g., the instruction may have been tested often, may be used in many paths throughout the source code 310, but may have been recently changed).

Figure 4:
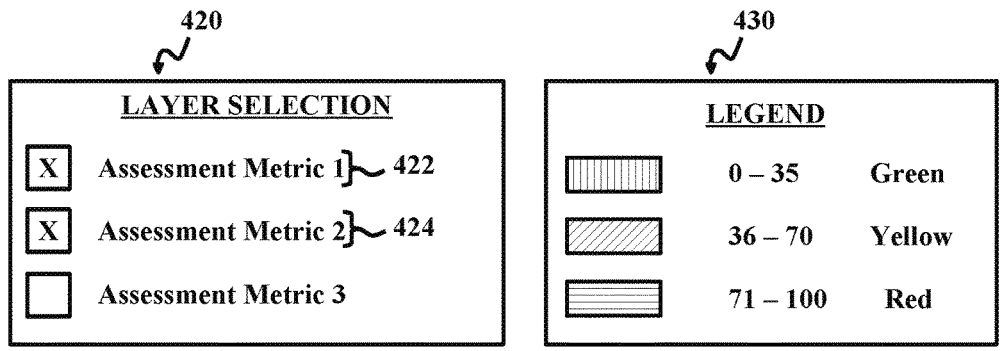
FIG. 4 illustrates an example of assessment score indicators as overlays superimposed over the line numbers of changed instructions, in accordance with embodiments of the present disclosure.

Referring now to FIG. 4, illustrated is an example of a code review window 400 that includes a source code 410, a layer selection prompt window 420, and a legend 430, in accordance with embodiments of the present disclosure. The source code 410 may include two changed instructions 416 and 418. The layer selection prompt window 420 may enable the user to select the assessment metrics that the user may want to focus on, as discussed in reference to FIG. 2. FIG. 4 further illustrates two assessment score indicators 412 and 414 as overlays superimposed over the line numbers of instructions found in the source code 410. The assessment score indicators 412 and 414 may correspond to the associated assessment scores as shown in the legend 430.

For example, a user may select two assessment metrics. The first selected assessment metric 422 may correspond to code coverage (e.g., how tested the instruction is). The second selected assessment metric 424 may correspond to change frequency (e.g., how often the instruction has been changed throughout the review process or over a predetermined period of time). The processor may generate an assessment score for each changed instruction 416 and 418 in source code 410, leaving unchanged instructions unmarked.

The processor may generate an assessment score of 30 for the first changed instruction 416 of the source code 410 based on the selected assessment metrics. The processor may then generate a first assessment score indicator 412 as a green overlay. The processor may superimpose the green overlay over the line numbers associated with the first changed instruction 416. The processor may also generate an assessment score of 80 for the second changed instruction 418 of the source code 410 based on the selected assessment metrics. The processor may then generate a second assessment score indicator 414 as a red overlay. The processor may superimpose the red overlay over the line number associated with the second changed instruction 418.

The first assessment score indicator 412 may signal to the user that the first changed instruction 416 may merit little to no review based on code coverage and change frequency. This may be because the first changed instruction 416 may have a high code coverage and low change frequency (e.g., the instruction may have been tested numerous times and the instruction may not have been changed often during the review process). Additionally, the second assessment score indicator 414 may signal to the user that the second changed instruction 418 may merit a relatively high level of review based on code coverage and change frequency. This may be because the second changed instruction 418 may have low code coverage and a high change frequency (e.g., the instruction may not have been tested often and the instruction may have been changed often during the review process).

Turning now to FIG. 5, illustrated is an example of a code review window 500 that includes a source code 510, a layer selection prompt window 520, and a legend 530. The source code 510 may include two changed instructions 516 and 518. The layer selection prompt window 520 may enable the user to select the assessment metrics that the user may want to focus on, as discussed in reference to FIG. 2. FIG. 5 further illustrates two assessment score indicators 512 and 514 as background layers shadowed in the background of the text and line numbers of the changed instructions 516 and 518, respectively. Additionally, FIG. 5 illustrates modification to the font of the text of the changed instructions 516 and 518 and their corresponding line numbers. The assessment score indicators 512 and 514 and the modification to the font may correspond to the associated assessment scores as shown in the legend 530.

For example, a user may select two assessment metrics. The first assessment metric 522 may correspond to defect density (e.g., the ratio of defects in the instruction compared to the instruction's size). The second assessment metric 524 may correspond to code usage (e.g., the number of times the instruction is hit during an integration run). The processor may generate an assessment score for each changed instruction 516 and 518 in source code 510, leaving unchanged instructions unmarked.

The processor may generate an assessment score of 20 for the first changed instruction 516 based on the selected assessment metrics. The processor may then generate a first assessment score indicator 512 as a green background layer. The processor may shadow the green background layer in the background of the text and line numbers associated with the first changed instruction 516; additionally, the processor may italicize the text of the first changed instruction 516 and its associated line numbers. The processor may also generate an assessment score of 60 for the second changed instruction 518 based on the selected assessment metrics. The processor may then generate a second assessment score indicator 514 as a yellow background layer. The processor may shadow the yellow background layer in the background of the text and line numbers associated with the second changed instruction 518; additionally, the processor may underline the text of the second changed instruction 518 and its associated line numbers.

The first assessment score indicator 512 and the italicization may signal to the user that the first changed instruction 516 may merit little to no review based on defect density and code usage. This may be because the first changed instruction 516 may have a low defect density and a low code usage (e.g., the instruction may be large with few defects and may not be hit often). Additionally, the second assessment score indicator 514 and the underlining may signal to the user that the second changed instruction 518 may merit moderate review based on defect density and code usage. This may be because the second changed instruction 518 may have a high defect density and a low code usage (e.g., the instruction may be small with many defects, but may not be hit often).

In some embodiments, the processor may generate a font color based on a first assessment metric and may generate an overlay based on a second assessment metric, or vice versa. For example, a user may select two assessment metrics. The first assessment metric may correspond to code complexity (e.g., how many paths the instruction uses throughout the source code). The second assessment metric may correspond to code coverage (e.g., how tested the instruction is). The processor may generate a metric score of 90 for a particular changed instruction based on code complexity and a metric score of 10 for the particular changed instruction based on code coverage. The processor may modify the font color of the text and/or line number(s) associated with the particular instruction to red, signaling to the user that the instruction may merit a relatively high level of review based on code complexity. Additionally, the processor may superimpose a green overlay over the text and/or line number(s) associated with the particular changed instruction, signaling to the user that the instruction may merit little to no review based on code coverage.

Referring now to FIG. 6, illustrated is an example of a code review window 600 that includes a source code 610, a layer selection prompt window 620, and a legend 630. The source code 610 may include two changed instructions 616 and 618. The layer selection prompt window 620 may enable the user to select the assessment metrics that the user may want to focus on, as discussed in reference to FIG. 2. FIG. 6 further illustrates a modification to the font of the text of the changed instructions 616 and 618. The modifications to the font may be assessment score indicators that correspond to the associated assessment scores as shown in the legend 630.

For example, a user may select two assessment metrics. The first selected assessment metric 622 may correspond to defect density (e.g., the ratio of defects in the instruction compared to the instruction's size). The second selected assessment metric 624 may correspond to code usage (e.g., the number of times the instruction is hit during an integration run). The processor may generate an assessment score for each changed instruction 616 and 618 in source code 610, leaving unchanged instructions unmarked.

The processor may generate an assessment score of 20 for the first changed instruction 616 based on the selected assessment metrics. The processor may then modify the font of the text associated with the first changed instruction 616 (e.g., the text on lines 3 through 4) by italicizing the associated text. Additionally, the processor may generate an assessment score of 90 for the second changed instruction 618 based on the selected assessment metrics. The processor may then modify the font of the text associated with the second changed instruction 618 (e.g., the text on line 14) by italicizing and underlining the associated text.

The italicization of the text associated with the first changed instruction 616 may indicate to the user that the first changed instruction 616 may merit little to no review based on defect density and code usage. This may be because the first changed instruction 616 may have a low defect density and a low code usage (e.g., the instruction may be large with few defects and may not be hit often). Additionally, the italicization and underlining of the text associated with the second changed instruction 618 may signal to the user that the second changed instruction 618 may merit a relatively high level of review based on defect density and code usage. This may be because the second changed instruction 618 may have a high defect density and a high code usage (e.g., the instruction may be small with many defects and may be hit often).

In some embodiments, the assessment score indicator may be a wordart (e.g., bubble lettering), outlining (e.g., using a different lining color than the filling color of the text), the modification of font color, hatching (e.g., lined patterns), and/or other patterning modification to the text or line number associated with the instruction. For example, the processor may modify the font color of the text of an instruction to red, signaling to the user that the instruction may merit a relatively high level of review.

Referring now to FIG. 7, illustrated is an example of a code review window 700 that includes a source code 710 and a reference source code 720. The source code 710 may include a changed instruction 712. The reference source code 720 may include a well-trusted instruction 722 (e.g., an instruction that has been determined by a reviewer to be sufficient for its designed function), which may be used by the user to review the changed instruction 712. The well-trusted instruction 722 may be stored in a repository of well-trusted instructions. The source code 710 may further include an alert 714, which may indicate to the user that a well-trusted instruction corresponding to the changed instruction 712 has been found.

In the example shown in FIG. 7, the alert 714 may be a hyperlink that indicates to the user that a well-trusted instruction 722 may have been identified by the processor. The well-trusted instruction 722 may correspond to the changed instruction 712 by functioning the same as, or logically equivalent to, the changed instruction 712. A user may interact with the alert 714 (e.g., by clicking the hyperlink), and the user may be directed to the reference source code 720 that contains the well-trusted instruction 722. The user may then determine whether to replace the changed instruction 712 with the well-trusted instruction 722.

In some embodiments, the alert may be a pop-up window listing all the instructions in a source code that may have corresponding, well-trusted instructions. For example, the processor may generate a separate pop-up window listing each changed instruction that may have a corresponding well-trusted instruction. A user may interact with the pop-up window (e.g., select a particular changed instruction from the list) and the user may be directed to the corresponding well-trusted instruction. The user may then determine whether to replace the particular changed instruction with its corresponding well-trusted instruction.

Figure 8:
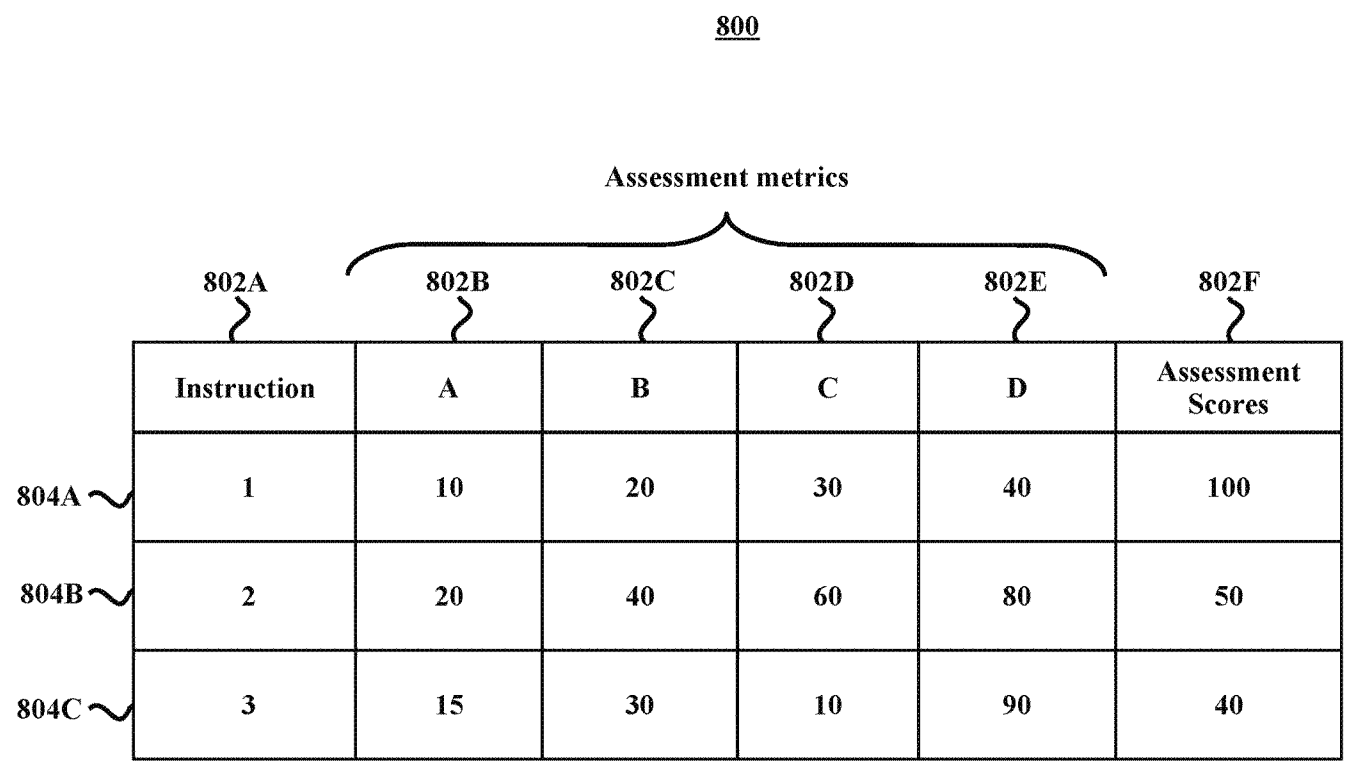

Referring now to FIG. 8, shown is an example table 800 illustrating the relationship between assessment metrics, metric scores, and assessment scores, in accordance with embodiments of the present disclosure. The table 800 is a visual representation of the relationship between the information used to generate assessment scores for a changed instruction, and is shown for illustrative purposes. In some embodiments, the computer system may not generate the table 800 when generating the assessment score for a changed instruction.

The table 800 may include six columns 802A-F and three rows 804A-C. Each row 804A-C may correspond to a changed instruction in source code for a program, and each column 802A-F may include corresponding information about the changed instruction(s). For example, the first column 802A may include a unique identifier for each changed instruction (e.g., a line number in the source code); the second, third, fourth, and fifth columns 802B-E may include metric scores for each changed instruction, and each metric score may correspond to a specific assessment metric; and the sixth column 802F may include the assessment scores for each changed instruction.

In the example shown in FIG. 8, each changed instruction in rows 804A-C may have a metric score for each assessment metric in columns 802B-E. For example, a processor may generate a metric score of 10 for instruction 1 (shown in the first row 804A) as it relates to assessment metric A (shown in the second column of 802B). The processor may additionally generate metric scores of 20, 30, and 40 for the other assessment metrics B, C, and D, respectively, as they relate to instruction 1. The processor may then combine the individual metric scores using any statistical or mathematical function to generate an assessment score for instruction 1.

In some embodiments, the processor may generate an assessment score for a changed instruction by adding the metric scores associated with the changed instruction. For example, changed instruction 1 may have a metric score of 10 based on assessment metric A, a metric score of 20 based on assessment metric B, a metric score of 30 based on assessment metric C, and a metric score of 40 based on metric D. The processor may generate an assessment score of 100 for changed instruction 1 by adding the associated metric scores (e.g., 10+20+30+40=100).

In other embodiments, the processor may generate an assessment score for a changed instruction by averaging the metric scores associated with the changed instruction. For example, changed instruction 2 may have a metric score of 20 based on assessment metric A, a metric score of 40 based on assessment metric B, a metric score of 60 based on assessment metric C, and a metric score of 80 based on metric D. The processor may generate an assessment score of 50 for changed instruction 2 by averaging the associated metric scores (e.g., (20+40+60+80)/4=50).

In further embodiments, the processor may weight (e.g., assign a weighting coefficient to) each metric score and generate an assessment score for a changed instruction by determining the weighted average of the metric scores associated with the changed instruction. For example, assessment metric A may be defect density, assessment metric B may be code coverage, assessment metric C may be code complexity, and assessment metric D may be change frequency. The processor may determine that assessment metric A, defect density, has the most effect on changed instruction 3 compared to the other assessment metrics B, C, and D. This may be because defect density has been flagged by a group of programmers as a metric indicative of high code error or need for review. Accordingly, the processor may assign a weighting coefficient of 5 to the metric score associated with assessment metric A. The processor also determine that assessment metric D, change frequency, has the lowest effect on changed instruction 3 compared to the other assessment metrics A, B, and C. This may be because change frequency is regarded by a group of programmers as a metric not indicative of code error or need for review. Accordingly, the processor may assign a weighting coefficient of ½ to the metric score associated with assessment metric D.

Following the example shown in FIG. 8, changed instruction 3 may have a metric score of 15 based on assessment metric A, a metric score of 30 based on assessment metric B, a metric score of 10 based on assessment metric C, and a metric score of 90 based on assessment metric D. The processor may generate an assessment score of 40 for the changed instruction 3 using the weighted average formula discussed in reference to FIG. 1 (e.g., [(5×15)+(1×30)+(1×10)+(0.5×90)]/4=(75+30+10+45)/4=40).

In some embodiments, the processor may weight each particular assessment score for each particular changed instruction (e.g., the processor may change the particular assessment score after the processor has generated the particular assessment score). Additionally, the processor may generate the weight given to each metric score and/or assessment score by any statistical function and is not limited to a specific equation. For example, a user may assign weighting coefficients to each assessment metric. The weighting coefficients may be assigned generally, or they depend on the specific combination of selected assessment metrics. For example, defect density may have a higher weighting coefficient when combined with change recency than it does when combined with code coverage. In some embodiments, the processor may generate each assessment score for each changed instruction using the same statistical function. For example, the processor may generate the assessment scores for all three changed instructions by adding the individual metric scores associated with each changed instruction.

Figure 9:
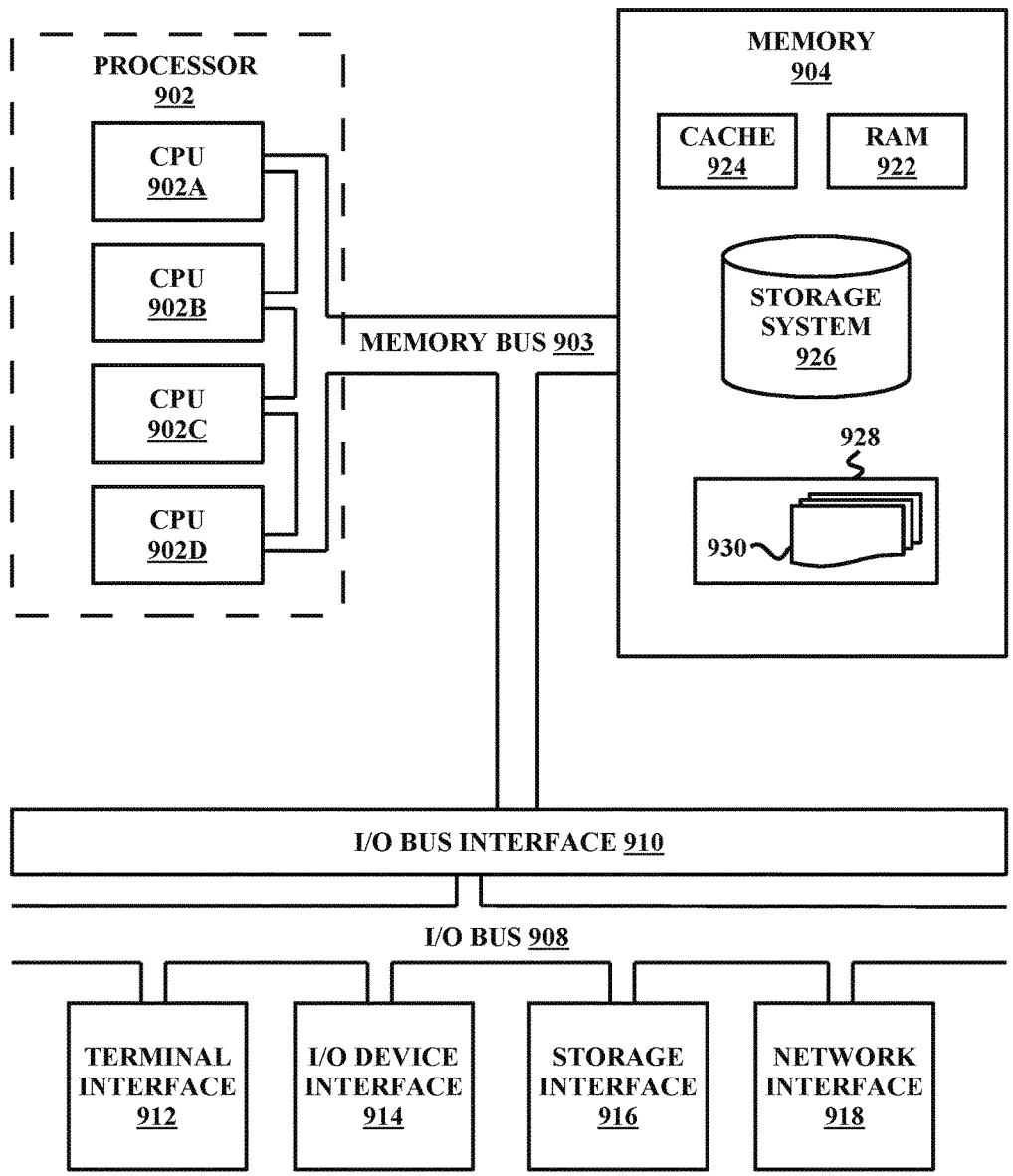
FIG. 9 illustrates a high-level block diagram of an example computer system that may be used in implementing one or more of the methods, tools, and modules, and any related functions, described herein, in accordance with embodiments of the present disclosure.

Referring now to FIG. 9, shown is a high-level block diagram of an example computer system 901 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 901 may comprise one or more CPUs 902, a memory subsystem 904, a terminal interface 912, a storage interface 916, an I/O (Input/Output) device interface 914, and a network interface 918, all of which may be communicatively coupled, directly or indirectly, for inter-component communication via a memory bus 903, an I/O bus 908, and an I/O bus interface unit 910.

The computer system 901 may contain one or more general-purpose programmable central processing units (CPUs) 902A, 902B, 902C, and 902D, herein generically referred to as the CPU 902. In some embodiments, the computer system 901 may contain multiple processors typical of a relatively large system; however, in other embodiments the computer system 901 may alternatively be a single CPU system. Each CPU 902 may execute instructions stored in the memory subsystem 904 and may include one or more levels of on-board cache.

System memory 904 may include computer system readable media in the form of volatile memory, such as random access memory (RAM) 922 or cache memory 924. Computer system 901 may further include other removable/non-removable, volatile/non-volatile computer system storage media. By way of example only, storage system 926 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 904 can include flash memory, e.g., a flash memory stick drive or a flash drive. Memory devices can be connected to memory bus 903 by one or more data media interfaces. The memory 904 may include at least one program product having a set (e.g., at least one) of program modules that are configured to carry out the functions of various embodiments.

One or more programs/utilities 928, each having at least one set of program modules 930 may be stored in memory 904. The programs/utilities 928 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 928 and/or program modules 930 generally perform the functions or methodologies of various embodiments.

Although the memory bus 903 is shown in FIG. 9 as a single bus structure providing a direct communication path among the CPUs 902, the memory subsystem 904, and the I/O bus interface 910, the memory bus 903 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 910 and the I/O bus 908 are shown as single respective units, the computer system 901 may, in some embodiments, contain multiple I/O bus interface units 910, multiple I/O buses 908, or both. Further, while multiple I/O interface units are shown, which separate the I/O bus 908 from various communications paths running to the various I/O devices, in other embodiments some or all of the I/O devices may be connected directly to one or more system I/O buses.

In some embodiments, the computer system 901 may be a multi-user mainframe computer system, a single-user system, or a server computer or similar device that has little or no direct user interface, but receives requests from other computer systems (clients). Further, in some embodiments, the computer system 901 may be implemented as a desktop computer, portable computer, laptop or notebook computer, tablet computer, pocket computer, telephone, smart phone, network switches or routers, or any other appropriate type of electronic device.

It is noted that FIG. 9 is intended to depict the representative major components of an exemplary computer system 901. In some embodiments, however, individual components may have greater or lesser complexity than as represented in FIG. 9, components other than or in addition to those shown in FIG. 9 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method, the method comprising:
    identifying, by a processor, source code for a program, the source code including one or more changed instructions;
    receiving, from a user, a selection of two or more assessment metrics for evaluating the source code;
    combining the two or more assessment metrics, thereby creating a custom metric;
    generating an assessment score for the one or more changed instructions in the source code according to the combination of the two or more assessment metrics;
    providing, to the user, an assessment score indicator for at least one changed instruction in the source code;
    identifying a first changed instruction, the first changed instruction being configured to perform a first function;
    identifying, automatically by the processor, a first reference instruction;
    determining, by executing the source code in a sandbox environment to identify the first function of the first changed instruction, that the first reference instruction is configured to perform the same first function as the first changed instruction;
    alerting the user that the first reference instruction corresponds to the first changed instruction; and
    replacing the first changed instruction with the first reference instruction.

2. The method of claim 1, wherein the source code includes the first changed instruction, the two or more assessment metrics include a first and a second assessment metric, and wherein the generating the assessment score comprises:
    determining a first metric score for the first changed instruction, wherein the first metric score corresponds to the first assessment metric of the selected two or more assessment metrics;
    determining a second metric score for the first changed instruction, wherein the second metric score corresponds to the second assessment metric of the selected two or more assessment metrics; and
    combining the first metric score and the second metric score.

3. The method of claim 1, wherein the generating the assessment score for the one or more changed instructions comprises:
    determining a set of metric scores for the one or more changed instructions, wherein each metric score corresponds to an associated assessment metric of the selected two or more assessment metrics;
    determining a weighting coefficient for each metric score, the weighting coefficient being based on a relationship between the selected two or more assessment metrics;
    weighting the set of metric scores according to the weighting coefficients; and
    combining the weighted metric scores for the one or more changed instructions.

4. The method of claim 1, wherein the receiving the selection of two or more assessment metrics comprises:
    providing the user with a list of assessment metrics; and
    prompting the user to select the two or more assessment metrics from the list of assessment metrics to be combined, the user thereby creating the custom metric.

5. The method of claim 1, wherein the providing, to the user, the assessment score indicator for the at least one changed instruction comprises:
    generating a visual signal of the assessment score for the at least one changed instruction; and
    outputting the visual signal of the assessment score for the at least one changed instruction to an output device.

6. The method of claim 5, wherein the visual signal of the assessment score includes a visual overlay superimposed on the at least one changed instruction and includes a font color, and wherein the outputting comprises:
    modifying the font color for the at least one changed instruction according to the assessment score.

7. A system comprising:
    an input device;
    an output device;
    a memory;
    a processor in communication with the memory, the processor being configured to perform a method comprising:
        identifying source code for a program, the source code including one or more changed instructions;
        receiving, from a user, a selection of two or more assessment metrics for evaluating the source code;
        combining the two or more assessment metrics, thereby creating a custom metric;

generating an assessment score for the one or more changed instructions in the source code according to the combination of the two or more assessment metrics;

providing, to the user, an assessment score indicator for at least one changed instruction in the source code;

identifying a first changed instruction, the first changed instruction being configured to perform a first function;

identifying a first reference instruction;

determining, by executing the source code in a sandbox environment to identify the first function of the first changed instruction, that the first reference instruction is configured to perform the same first function as the first changed instruction;

alerting the user that the first reference instruction corresponds to the first changed instruction; and replacing the first changed instruction with the first reference instruction.

8. The system of claim 7, wherein the source code includes the first changed instruction, the two or more assessment metrics include a first and a second assessment metric, and wherein the generating the assessment score comprises:

determining a first metric score for the first changed instruction, wherein the first metric score corresponds to the first assessment metric of the selected two or more assessment metrics;

determining a second metric score for the first changed instruction, wherein the second metric score corresponds to the second assessment metric of the selected two or more assessment metrics; and combining the first metric score and the second metric score.

9. The system of claim 7, wherein the generating the assessment score for the one or more changed instructions comprises:

determining a set of metric scores for the one or more changed instructions, wherein each metric score corresponds to an associated assessment metric of the selected two or more assessment metrics;

determining a weighting coefficient, the weighting coefficient being based on a relationship between the selected two or more assessment metrics;

weighting the set of metric scores according to the weighting coefficients; and combining the weighted metric scores for the one or more changed instructions.

10. The system of claim 7, wherein the receiving the selection of two or more assessment metrics comprises:

providing the user with a list of assessment metrics; and prompting the user to select the two or more assessment metrics from the list of assessment metrics to be combined, the user thereby creating the custom metric.

11. The system of claim 7, wherein the providing, to the user, the assessment score indicator for the at least one changed instruction comprises:

generating a visual signal of the assessment score for the at least one changed instruction; and outputting the visual signal of the assessment score for the at least one changed instruction to the output device.

12. The system of claim 11, wherein the visual signal of the assessment score includes a visual overlay superimposed on the at least one changed instruction and includes a font color, and wherein the outputting comprises:

modifying the font color for the at least one changed instruction according to the assessment score.

13. A computer program product comprising a non-transitory computer readable storage medium having program instructions embodied therewith, the program instructions executable by a processor to cause the processor to perform a method, the method comprising:

identifying, by a processor, source code for a program, the source code including one or more changed instructions;

receiving, from a user, a selection of two or more assessment metrics for evaluating the source code;

combining the two or more assessment metrics, thereby creating a custom metric;

generating an assessment score for the one or more changed instructions in the source code according to the combination of the two or more assessment metrics;

providing, to the user, an assessment score indicator for at least one changed instruction in the source code;

identifying a first changed instruction, the first changed instruction being configured to perform a first function;

identifying, automatically by the processor, a first reference instruction;

determining, by executing the source code in a sandbox environment to identify the first function of the first changed instruction, that the first reference instruction is configured to perform the same first function as the first changed instruction;

alerting the user that the first reference instruction corresponds to the first changed instruction; and replacing the first changed instruction with the first reference instruction.

14. The computer program product of claim 13, wherein the source code includes the first changed instruction, the two or more assessment metrics include a first and a second assessment metric, and wherein the generating the assessment score comprises:

determining a first metric score for the first changed instruction, wherein the first metric score corresponds to the first assessment metric of the selected two or more assessment metrics;

determining a second metric score for the first changed instruction, wherein the second metric score corresponds to the second assessment metric of the selected two or more assessment metrics; and combining the first metric score and the second metric score.

15. The computer program product of claim 13, wherein the generating the assessment score for the one or more changed instructions comprises:

determining a set of metric scores for the one or more changed instructions, wherein each metric score corresponds to an associated assessment metric of the selected two or more assessment metrics;

determining a weighting coefficient for each metric score, the weighting coefficient being based on a relationship between the selected two or more assessment metrics;

weighting the set of metric scores according to the weighting coefficients; and combining the weighted metric scores for the one or more changed instructions.

16. The computer program product of claim 13, wherein the receiving the selection of two or more assessment metrics comprises:

providing the user with a list of assessment metrics; and prompting the user to select the two or more assessment metrics from the list of assessment metrics to be combined, the user thereby creating the custom metric.

17. The computer program product of claim 13, wherein the providing, to the user, the assessment score indicator for the at least one changed instruction comprises:

generating a visual signal of the assessment score for the at least one changed instruction, wherein the visual signal of the assessment score includes a visual overlay superimposed on the at least one changed instruction and includes a font color; and outputting the visual signal of the assessment score for the at least one changed instruction to an output device, wherein the outputting includes modifying the font color of the at least one changed instruction according to the assessment score.

* * * * *